United States Patent [19]

Hemenway et al.

[11] 4,305,347
[45] Dec. 15, 1981

[54] INHALATION TOXICOLOGY CHAMBER

[75] Inventors: David R. Hemenway, Simsbury, Conn.; Linwood A. Stedman, Sanford, Me.

[73] Assignee: The Baker Company, Inc., Sanford, Me.

[21] Appl. No.: 144,890

[22] Filed: Apr. 29, 1980

[51] Int. Cl.³ .............................................. A01K 1/03
[52] U.S. Cl. ..................................................... 119/15
[58] Field of Search ....................... 119/15, 19, 30, 35, 119/37, 17, 18

[56] References Cited

U.S. PATENT DOCUMENTS

| | | | |
|---|---|---|---|
| 2,791,199 | 5/1957 | Hamnett | 119/35 |
| 3,237,599 | 3/1966 | Torrey et al. | 119/19 |
| 3,367,308 | 2/1968 | Quattrone et al. | 119/15 |
| 3,396,703 | 8/1968 | Trussell | 119/30 |
| 3,584,927 | 6/1971 | Ott et al. | 119/37 X |
| 4,216,741 | 8/1980 | Moss | 119/15 |

Primary Examiner—Hugh R. Chamblee

[57] ABSTRACT

A multi-level, animal inhalation toxicology research chamber system is disclosed. It has an enclosed airtight chamber defining a central enclosure with vertically extending inlet and outlet plenums at its opposite ends. A plurality of vertically spaced horizontally extending perforated shelves with underlying collection pans are provided for supporting laboratory animal cages vertically spaced on a plurality of levels. Air is distributed from the inlet plenum to the outlet plenum means through the animal cages in a horizontal direction. The collection pans prevent vertical fluid communication and the perforated shelves permit passage of animal waste into the collection pan, thereby preventing animals from contacting their own waste and preventing waste from falling on animals located beneath an upper cage.

6 Claims, 4 Drawing Figures

INHALATION TOXICOLOGY CHAMBER

This invention relates to animal research chambers for providing controlled environmental contaminants to laboratory animals, and, more particularly, to such animal research chambers used in inhalation toxicology research.

Various inhalation or exposure chambers have been developed with the object of providing controlled levels of contaminants to animals or plants in order to assess their impact on such animals or plants. Many of these, however, have been deficient in a number of respects and have failed to provide a suitable chamber capable of evenly distributing the contaminants carried to the chamber, evenly distributing the air flow carrying the contaminants, eliminating "raining" of fecal material on animals located beneath an upper shelf in the chamber, or facilitating easy repair of chamber components and ease in cleaning the chamber.

These disadvantages are especially apparent when the research involves tens or hundreds of small laboratory animals such as mice, gerbels, or rabbits. One such disadvantage is the necessity of using an individual chamber or cage for each animal in order to provide a uniform concentration of an environmental contaminant to the caged animal. Examples of such systems are shown and described in Holman, U.S. Pat. No. 3,924,571 Runkle et al., U.S. Pat. No. 3,630,174. Another disadvantage is the use of only a single level of cages rather than stacked cages to eliminate the fecal rain problem, thus, effectively limiting the number of animals that could participate in an experiment. Such an apparatus is shown and described in Eagleson, Jr., U.S. Pat. No. 3,877,420.

In view of such disadvantages of the prior art, it is a major object of the present invention to provide a novel inhalation toxicology chamber capable of providing a uniform horizontal laminar air flow of contaminants through the chamber.

It is another object of the present invention to provide a novel inhalation toxicology chamber capable of providing a uniform concentration of contaminants in the air flow.

It is a further object of the present invention to provide a novel inhalation toxicology chamber capable of eliminating fecal rain.

It is a still further object of the present invention to provide a novel inhalation toxicology chamber capable of facilitating easy repair of chamber components and ease in cleaning the chamber.

In order to accomplish these objectives, the present invention provides a novel multi-level inhalation toxicology research chamber system comprising an enclosed airtight chamber. The enclosed chamber has imperforate top, bottom, rear, front and outer end walls and perforate inner end walls spaced inwardly from the outer end walls. The space between the top and bottom walls, the rear and front walls, and the perforate inner end walls defines a central enclosure for containing a plurality of perforate bottomed laboratory animal cages which are spaced vertically from one another on a plurality of levels.

The space between the top and bottom walls, the rear and front walls, the perforate inner end walls, and the imperforate outer end walls defines vertically extending inlet and outlet plenum means at opposite ends of the chamber for distributing air from the inlet plenum means to the outlet plenum means through the perforate inner walls and the animal cages in a horizontal direction across the central enclosure.

Preferably, the inlet plenum means and the outlet plenum means each has a plurality of diffusion screen means, such that the inlet plenum diffusion screen means are adapted to distribute air in a horizontal direction across the central enclosure and the outlet plenum diffusion screen means are adapted to eliminate excess air velocity gradients, thereby maintaining the horizontally distributed air flow across the central enclosure. Inlet means is provided for introducing air into the inlet plenum means, and outlet means is provided for venting air from the outlet plenum means.

The chamber further includes a plurality of vertically spaced animal cage support means, with each of such cage support means extending throughout the horizontal cross section of the central animal cage enclosure. Each support means includes an upper horizontal perforated shelf means for supporting the cages and a lower imperforate collection pan means for preventing vertical fluid communication between the vertically spaced cages within the central enclosure. Thus, contaminated air is distributed from the inlet plenum means to the outlet plenum means through the perforate inner walls and the animal cages in a horizontal direction across the central enclosure.

The imperforate pan means prevents vertical fluid communication between the vertically spaced cages within the central enclosure and the perforated shelf means permits vertical passage of animal waste into the collection pan means for collection therein, thereby preventing animals from contacting their own waste and preventing waste from falling on animals located beneath an upper cage.

The inhalation chamber system of the invention may further include mixing means connected to the inlet means for providing a uniform concentration of contaminant in the air introduced into the inlet plenum means for inhalation toxicology research utilizing the animals. The mixing means may include an air inlet adapted to receive a stream of supply air, one or more contaminant inlets adapted to provide one or more different contaminants to the supply air, and a mixing chamber adapted to achieve controlled and uniformed mixing of the air with contaminants and to minimize large particles and agglomerates from the air introduced into the inlet means.

Other objects, features, and advantages of the present invention will appear from the following detailed description of a preferred embodiment thereof, taken together with the accompanying drawings, wherein.

Figure 1:
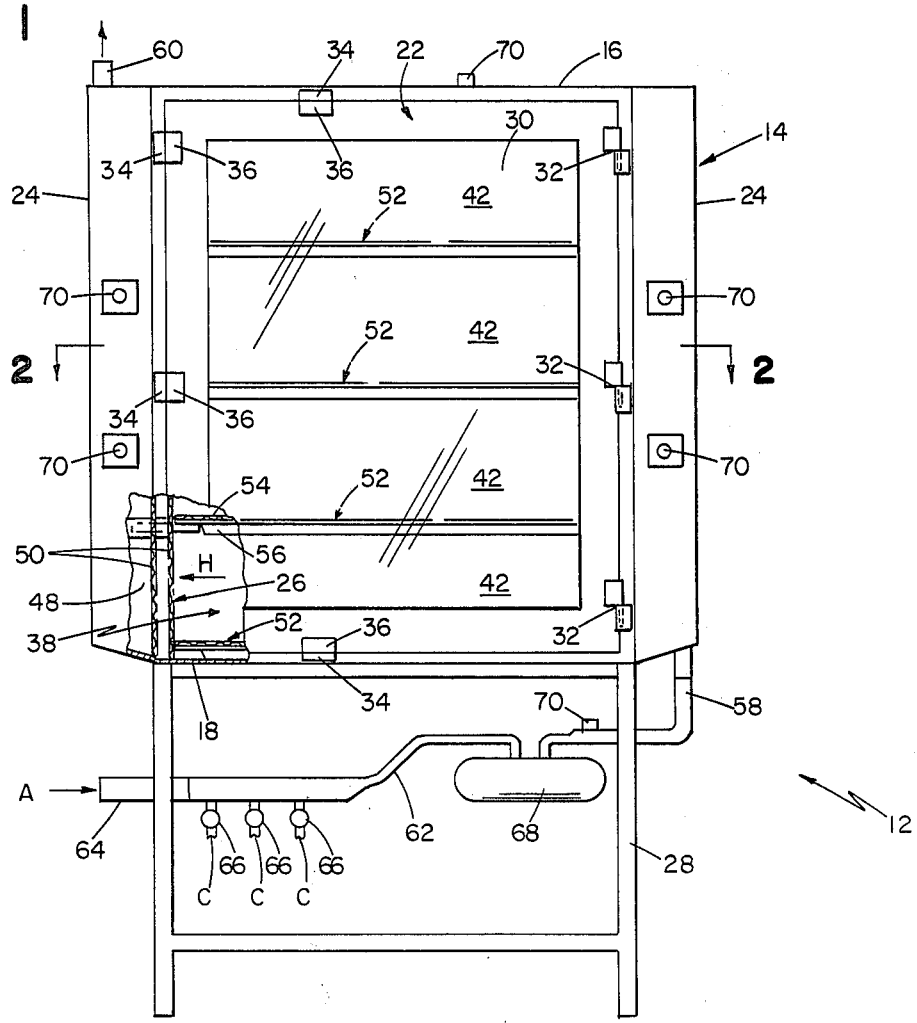
FIG. 1 is a front view of the inhalation toxicology research chamber according to the present invention.

Referring to the drawings, a multi-level inhalation toxicology research chamber system is provided for inhalation toxicology research utilizing animals.

Figure 2:
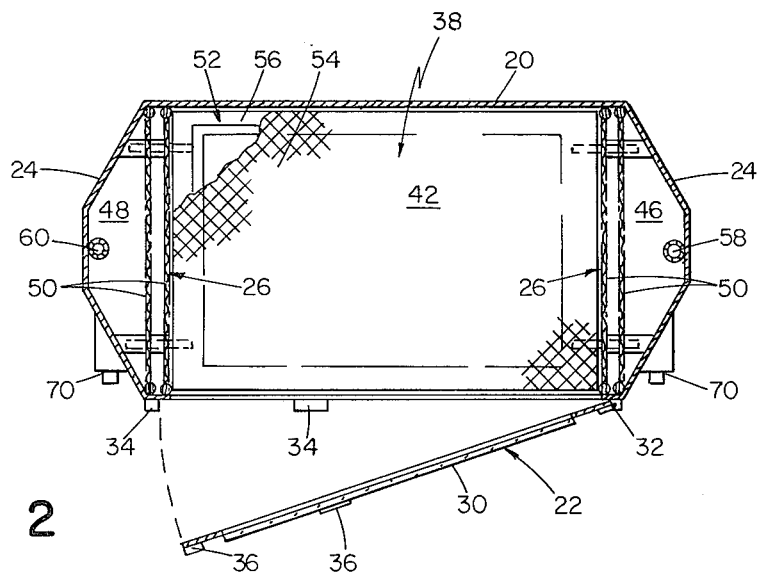
FIG. 2 is a horizontal cross section view taken along line 2—2 of FIG. 1, with the front door open, of the inhalation toxicology research chamber shown in FIG. 1.

More specifically, the novel inhalation research system of the invention comprises an enclosed airtight chamber, generally designated 14, with imperforate top wall 16, bottom wall 18, rear wall 20, front wall 22 and outer end walls 24, and perforate inner end walls 26 spaced inwardly from the outer end walls 24. Chamber 14 is mounted on legs 28 for locating the chamber at a convenient height for working. A pane of glass 30, mounted on front wall 22, permits the interior of chamber 14 to be viewed. Front wall 22 is removably mounted on hinges 32 and can be opened to permit access into the interior of chamber 14, as shown in FIG. 2, and locked during operation by locks 34 and latches 36 to ensure an airtight chamber.

Figure 4:
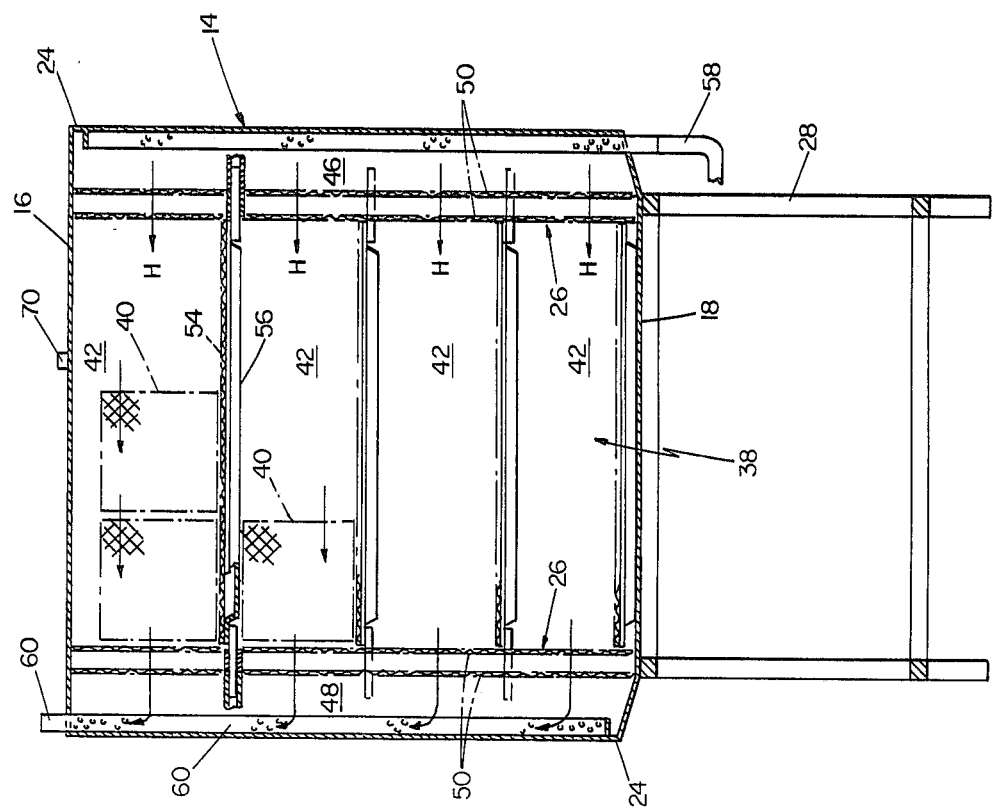
FIG. 4 is a diagrammatical front view of the horizontal laminar air flow within the inhalation toxicology research chamber shown in FIG. 1.
Figure 3:
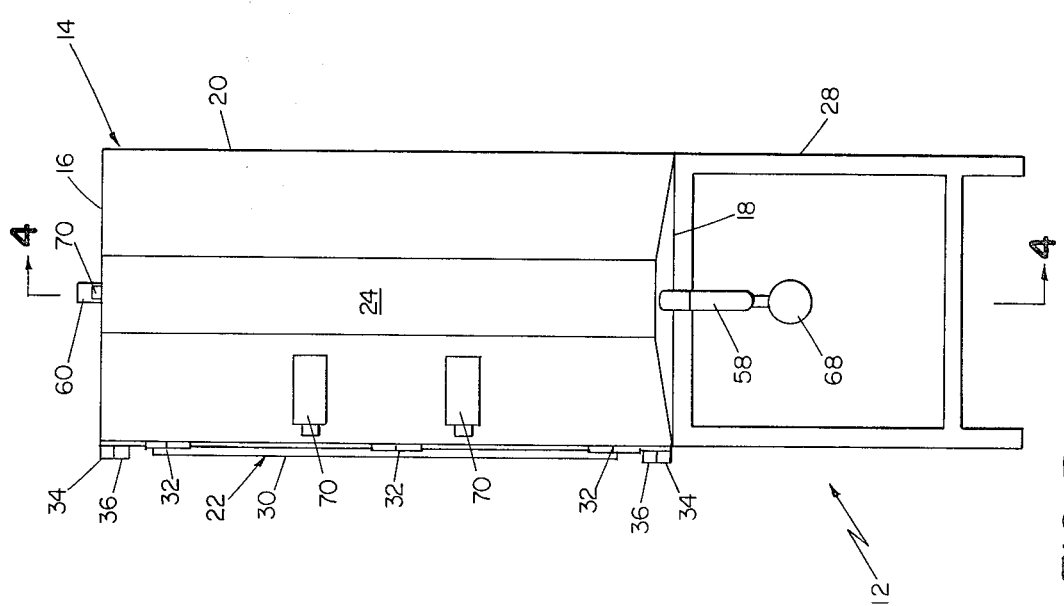
FIG. 3 is a side view of the inhalation toxicology research chamber shown in FIG. 1.

The space between the top wall 16, bottom wall 18, rear wall 20, front wall 22, and perforate inner end walls 26 defines a central enclosure 38 for containing a plurality of perforate side and bottom laboratory animal cages 40 vertically spaced from one another on a plurality of levels 42, as shown in FIG. 4.

The space between the top wall 16, bottom wall 18, rear wall 20, front wall 22, perforate inner end walls 26, and imperforate outer end walls 24 defines vertically extending inlet and outlet plenums 46 and 48, respectively, at the opposite ends of chamber 14. The inlet plenum 46 and the outlet plenum 48 each includes three diffusion screens 50 positioned between the perforate inner end wall 26 and the imperforate outer end wall 24, the diffusion screens 50 being parallel with the perforate inner end wall 26. An air inlet 58 is provided for introducing air into the inlet plenum 46, and an air outlet 60 is provided for venting air from the outlet plenum 48.

The inlet plenum diffusion screens 50 are adapted to distribute air through the perforate inner walls 26 and the animal cages 40 in a horizontal direction across central enclosure 38, while the outlet plenum diffusion screens 50 are adapted to maintain this horizontally distributed air flow across central enclosure 50 by eliminating excess air velocity gradients present at the outlet plenum 48.

At each of the several levels 42 in central enclosure 38 is a vertically spaced animal cage support 52 that extends throughout the horizontal cross section of the central animal cage enclosure 38. Each support 52 includes an upper horizontal perforated shelf 54 for supporting cages 40 and a lower imperforate collection pan 56 for preventing vertical fluid communication between the vertically spaced cages 40 within central enclosure 38. Thus, a perforated shelf 54 permits vertical passage of animal waste material into its underlying collection pan 56 for collection therein, thereby eliminating fecal rain on animals located beneath an upper cage 40 and preventing animals from contacting their own fecal material. This configuration also allows multiple species to be placed in a single chamber for exposure to a single concentration of environmental contaminant without problems of interspecies contamination.

The inhalation chamber system of the invention further includes a mixing system, generally designated 62 for providing a uniform concentration of environmental contaminant to the air introduced into the inlet plendum 46. Mixing system 62 is connected to inlet 58 and includes an air inlet 64 adapted to receive a stream of supply air A, three contaminant inlets 66 adapted to provide a maximum of three different environmental contaminants C to air A, and a mixing chamber 68 adapted to achieve a controlled and uniformed mixing of air A with contaminants C and to minimize large particles and agglomerates from the air A introduced into the inlet 58.

Further alternative embodiments include sample ports 70 in the inhalation chamber system 12 to detect the concentration of contaminants C flowing in the system. The sample ports 70 are positioned at the mixing chamber 68 to detect the initial concentration, at the inlet 58, between first and second inlet plenum diffusion screens 50, at the outlet plenum 48, and at the top wall 16 of enclosed chamber 14.

The operation of inhalation chamber system 12 is best described with reference to FIG. 4, in which arrows H represent the horizontal laminar air flow. Air A, uniformly mixed with one or more desired environmental contaminants C, is fed into the inlet 58, which distributes air A to the inlet plenum 46. The configuration of the inlet plenum 46 in cooperation with the three inlet plenum diffusion screens 50 creates the horizontal laminar air flow H. The horizontal air flow H evenly distributes the environmental contaminants C to the encaged laboratory animals, so that contaminated air is distributed from inlet plenum 46 to outlet plenum 40 through perforate inner walls 26 and animal cages 40 in a horizontal direction across central enclosure 38.

The three outlet plenum diffusion screens 50 and the outlet plenum 48 maintain this horizontal air flow H by eliminating excess air velocity gradients that are invariably present at the outlet plenum 48. Outlet 60 then vents air A from the outlet plenum 48.

During the operation of the inhalation chamber system 12, sample data on the concentration of contaminants C throughout the system can be obtained at sample ports 70.

Imperforate pans 56 prevent vertical fluid communication between vertically spaced cages 40 within central enclosure 38, while perforated shelf 54 permits vertical passage of animal waste into its underlying collection pan 56 for collection therein, thereby preventing animals from contacting their own waste and preventing waste from falling on animals located beneath an upper cage.

What is claimed is:

1. A multi-level toxicology research chamber for exposing a plurality of test animals to airborne contaminants comprising an enclosed airtight chamber having imperforate top, bottom, rear, front and outer end walls and perforate inner end walls spaced inwardly from said outer end walls the space between said top and bottom walls, said rear and front walls and said perforate inner end walls defining a central enclosure, and the space between said top and bottom walls, said rear and front walls, said perforate inner end walls and said imperforate outer end walls defining vertically extending inlet and outler plenum means at opposite ends of said chamber a plurality of vertically spaced animal cage support means each extending throughout the horizontal cross section of said central animal cage enclosure adapted to support a plurality of perforate side and bottom laboratory animal cages vertically spaced from one another on a plurality of levels, said support means each including upper horizontal perforated shelf means adapted to support said cages and lower imperforate collection pan means, said imperforate pan means preventing vertical fluid communication between said vertically spaced cages within said central enclosure and said perforated shelf means permitting vertical passage of animal waste into said collection pan means for collection therein, contaminant introduction means for introducing and uniformly mixing contaminant into an air supply inlet means communicating with said inlet plenum means and with said contaminant introduction means for conveying air mixed with contaminant from said contaminant introduction means to said inlet plenum means, outlet means communicating with said outlet plenum means for venting air from said outlet plenum means said perforate walls and said plenum means being mutually constructed and disposed to provide uniform, horizontal air flow throughout said central enclosure whereby each test animal in the central enclosure is equally exposed to the air supply and admixed contaminant while being shielded from contact with their and other animal's excreta.

2. The inhalation chamber system as claimed in claim 1, wherein said mixing means include an air inlet adapted to receive a stream of supply air contaminant inlet means adapted to receive one or more contaminants, and a mixing chamber adapted to achieve controlled and uniformed mixing of air with said contaminants and to minimize large particles and agglomerates from the air introduced into said inlet means.

3. The inhalation chamber system as claimed in claim 2, wherein:

said mixing means includes a plurality of contaminant inlets for providing a plurality of different contaminants to said air.

4. The inhalation chamber system as claimed in claim 1 or 3, wherein said inlet plenum means includes diffusion screen means adapted to distribute air in a horizontal direction across said central enclosure, and said outlet plenum means include diffusion screen means adapted to eliminate excess air velocity gradients, thereby maintaining said horizontally distributed air flow across said central enclosure.

5. The inhalation chamber system as claimed in claim 4, wherein said inlet plenum means and said outlet plenum means diffusion means each include a plurality of diffusion screens.

6. A multi-level, animal inhalation toxicology research chamber system comprising an enclosed airtight chamber having imperforate top, bottom, rear, front and outer end walls and perforate inner end walls spaced inwardly from said outer end walls the space between said top and bottom walls, said rear and front walls and said perforate inner end walls defining a central enclosure, and the space between said top and bottom walls, said rear and front walls, said perforate inner end walls and said imperforate outer end walls defining vertically extending inlet and outlet plenum means at opposite ends of said chamber said inlet plenum means and said outlet plenum means each include three diffusion screens, whereby said inlet diffusion screens are adapted to distribute air in a horizontal direction across said central enclosure, and said outlet diffusion screens are adapted to eliminate excess air velocity gradients, thereby maintaining said horizontally distributed air flow across said central enclosure a plurality of vertically spaced animal cage support means each extending throughout the horizontal cross section of said central animal cage enclosure adapted to support a plurality of perforate side and bottom laboratory animal cages vertically spaced from one another on a plurality of levels, said support means each including upper horizontal perforated shelf means adapted to support said cages and lower imperforate collection pan means, inlet means communicating with said inlet plenum means for introducing air into said inlet plenum means outlet means communicating with said outlet plenum means for venting air from said outlet plenum means, and mixing means connected to said inlet means providing a uniform concentration of contaminant in air introduced into said inlet plenum means for inhalation toxicology research utilizing said animals, said mixing means including an air inlet adapted to receive a stream of supply air contaminant inlet means adapted to provide one or more different contaminants to said air, and a mixing chamber adapted to achieve controlled and uniformed mixing of air with said contaminants and to minimize large particles and agglomerates from the air introduced into said inlet means whereby contaminanted air is distributed from said inlet plenum means to said outlet plenum means through said perforate inner walls and said animal cages in a horizontal direction across said central enclosure and said imperforate pan means prevents vertical fluid communication between said vertically spaced cages within said central enclosure and said perforated shelf means permits vertical passage of animal waste into said collection pan means for collection therein, thereby preventing animals from contacting their own waste and preventing waste from falling on animals located beneath an upper cage.

* * * * *